United States Patent Office 2,781,238
Patented Feb. 12, 1957

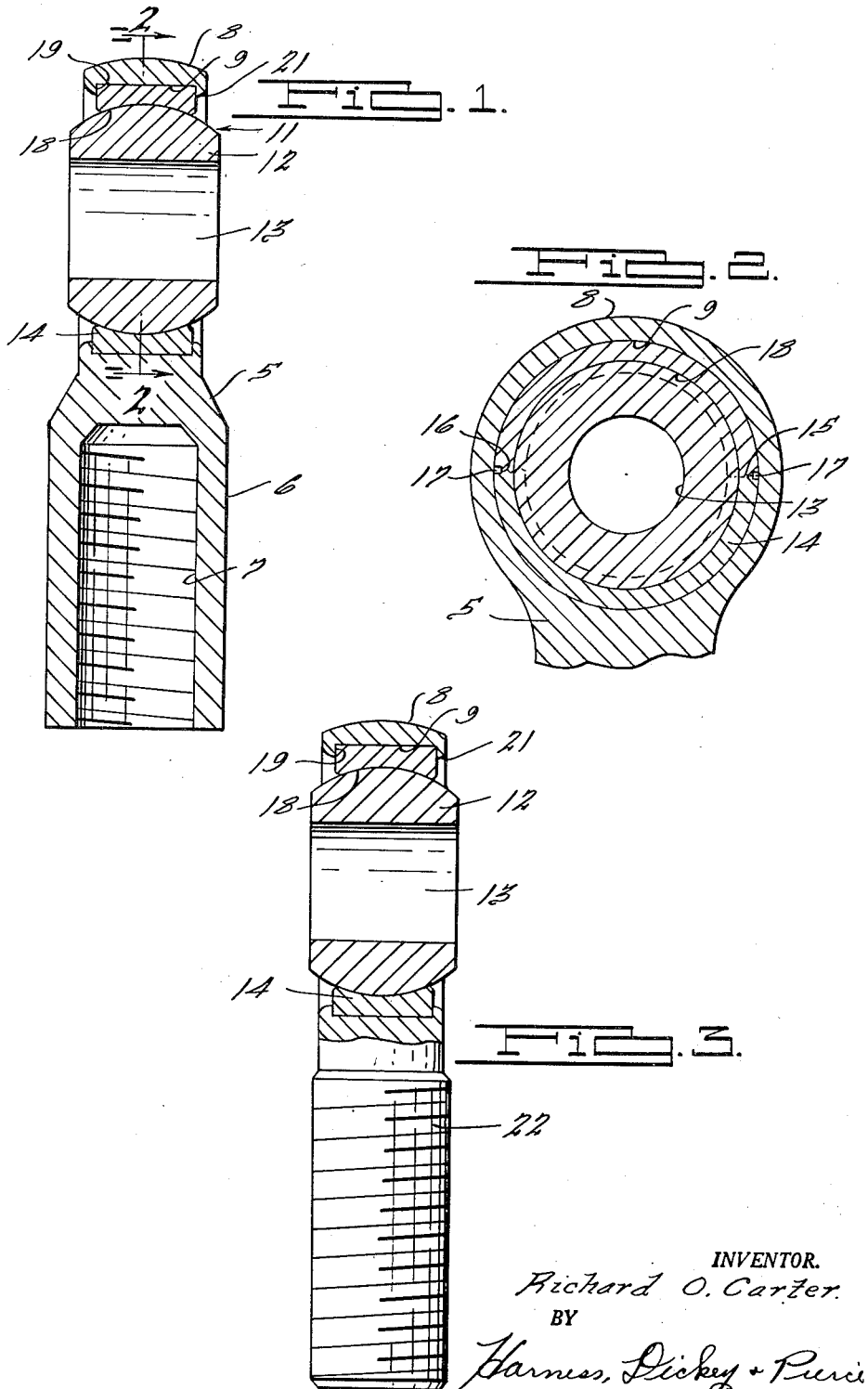

2,781,238

BALL TYPE BEARING FOR ROD END

Richard O. Carter, Grosse Pointe Woods, Mich.

Application October 23, 1953, Serial No. 387,902

1 Claim. (Cl. 308—72)

This invention relates to a rod end having a ball type bearing, and particularly to a ball type bearing having a split race which is retained in unit relation by the head thereof.

Difficulty has been experienced in the past in constructing ball type bearings for rod ends which are of simple construction and which provide a flexibility of movement. This difficulty was overcome in the present invention by employing an outer race which is separated at diametrical points so that it may be fitted over the ball portion of the bearing and be maintained in intimate relationship therewith when pressed within an aperture in the head provided on the rod end. The race is maintained in alignment against lateral shifting by shoulders provided at the ends of the aperture which may be formed by a peening or other operation.

Accordingly, the main objects of the present invention are: to provide a simple ball type bearing for a rod end which is supported directly in an aperture in the head provided on the rod end; to encompass the ball portion of the bearing by the race which has been cracked so as to separate at diametrically opposite points so that it may be assembled over the ball and retained in cylindrical arrangement within an aperture in the head provided on the rod end, and, in general, to form a flexible joint on the rod end by a ball encompassed by a race separated at diametrical points, all of which is simple in construction, positive in operation, and economical of manufacture.

Other objects and features of novelty of the invention will be specifically pointed out or will become apparent when referring, for a better understanding of the invention, to the following description, taken in conjunction with the accompanying drawing, wherein:

Figure 1 is a sectional view of a ball type bearing on a rod end having an internally threaded shank, embodying features of the present invention;

Fig. 2 is a broken sectional view of the structure illustrated in Fig. 1, taken on the line 2—2 thereof; and Fig. 3 is a view of structure, similar to that illustrated in Fig. 1, having an externally threaded stem.

Referring to Figs. 1 and 2, the rod end 5 has a shank 6 containing a threaded aperture 7 for receiving the threaded end of a rod. The shank has a head 8 thereon containing an annular aperture 9 which receives the bearing assembly 11. The bearing assembly embodies a ball portion 12 having a central aperture 13 and an encompassing race 14. As illustrated in Fig. 2, the race is cracked at diametrically opposite points 15 and 16 by the application of pressure thereto. Slots 17 are provided in the race at diametrically opposite points to locate the points at which the cracks will occur. The separation of the race 14 into two halves permits the half portions to be assembled about the ball 12, with the truncated spherical surface 18 disposed in intimate engagement with the ball surface when the two halves are forced back substantially to their original position. When in this position the race is forced into the aperture 9 of the head 8 against a shoulder 19 and retained thereagainst by the peened-over edge 21 on the opposite side of the head. The intimate engagement of the race with the inner surface of the aperture 9 of the head 8 retains the two halves of the race in substantially cylindrical relationship with the inner truncated spherical surface 18 in engagement with the ball surface throughout the entire area thereof. Preferably the ball 12 is made of sintered powdered metal and is oil-impregnated so that the mating surface between the ball and race is continuously lubricated. The powdered material may be steel, bronze, graphite, or a nonmetallic material may be employed having a low friction and wear coefficient.

In Fig. 3 a similarly constructed rod end is illustrated, with the exception that a threaded stud 22 has been substituted for the shank 6 so that the ball end may be threaded into a socket. Otherwise the construction is the same as that of the rod end illustrated and described with relation to Figs. 1 and 2.

What is claimed is:

A rod end having a head containing an aperture, a race having a cylindrical outer surface and a truncated spherical inner surface, said race having diametrically disposed slots substantially parallel to the axis of said race and extending inwardly from the outer surface, the portions of the race from the bottom of the slots to the inner surface being broken providing irregular mating surfaces at the broken areas, a ball having a truncated spherical surface disposed within the two halves of said race and retained in intimate relationship therewith when the two halves of the race are pressed within the aperture of said head so that the broken areas are in intimate relationship, and means for preventing the lateral shifting of the race within said aperture, said ball being larger than said race and made of porous material containing a lubricant.

References Cited in the file of this patent

UNITED STATES PATENTS

| | | |
|---|---|---|
| 2,048,763 | Whiteley | July 28, 1936 |
| 2,365,552 | Hill | Dec. 19, 1944 |
| 2,478,660 | Keahey | Aug. 9, 1949 |
| 2,652,297 | Stearns et al. | Sept. 15, 1953 |